United States Patent [19]

Abbagnaro et al.

[11] 4,359,768
[45] Nov. 16, 1982

[54] VERTICAL TRACKING ANGLE METER

[75] Inventors: Louis A. Abbagnaro, Shelton; Arthur J. Gust, Greenwich, both of Conn.

[73] Assignee: CBS Inc., New York, N.Y.

[21] Appl. No.: 251,601

[22] Filed: Apr. 6, 1981

[51] Int. Cl.³ .......................... G11B 27/36; G11B 3/06
[52] U.S. Cl. ........................................ 369/55; 369/53; 369/132
[58] Field of Search ........................ 369/53, 55, 56-58, 369/127-128, 132

[56] References Cited

PUBLICATIONS

B. B. Bauer, "The Vertical Tracking Angle Problem in Stereophonic Record Production", IEEE Trans. Audio vol. AV-11, 1963, Mar.-Apr., pp. 47-55.

B. B. Bauer, "Vertical Tracking Improvement in Stereo Recording", *Audio*, Feb. 1963, pp. 1-4.

J. V. White & A. J. Gust, "Measurement of FM Distortion in Phonographs", *Journal of AES*, vol. 27, No. 3, Mar. 1979, pp. 121-133.

J. V. White & A. J. Gust, "Three FM Methods for Measuring Tracking Angles of Phono Pickups" *Journal of AES*, vol. 27, No. 4, Apr. 1979, pp. 242-249.

*Primary Examiner*—Raymond F. Cardillo, Jr.
*Attorney, Agent, or Firm*—Spencer E. Olson

[57] ABSTRACT

Measuring instrument which extracts and directly displays the vertical tracking angle of a phonograph pickup during playback of a known test record signal, and which also has the capability of measuring and directly displaying tracing distortion.

10 Claims, 5 Drawing Figures

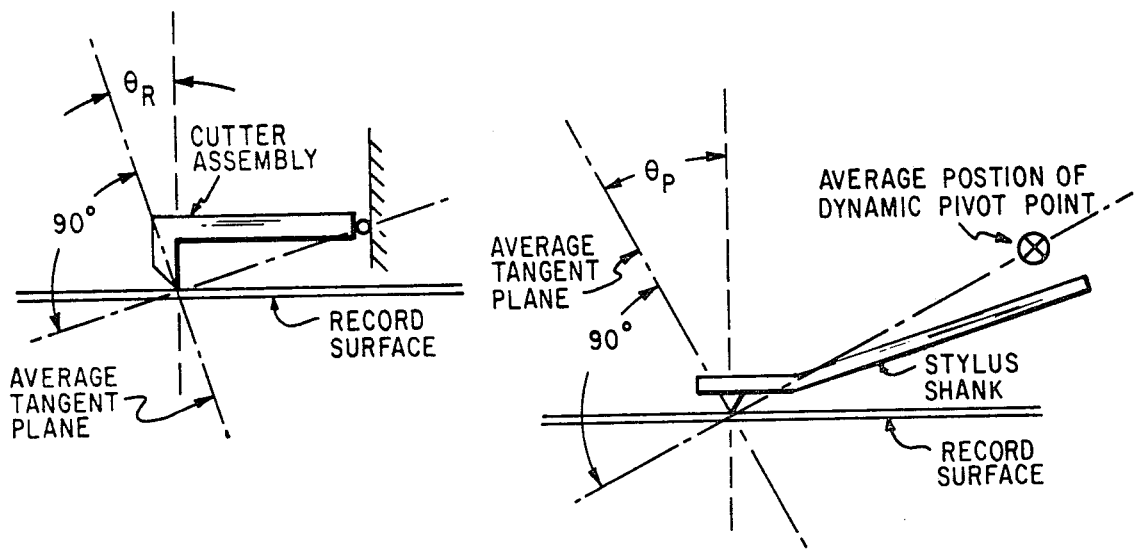
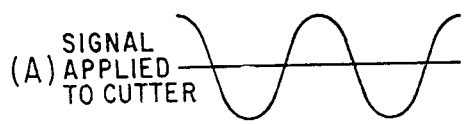
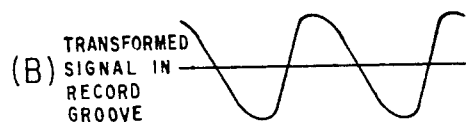
Fig. 1
Fig. 2
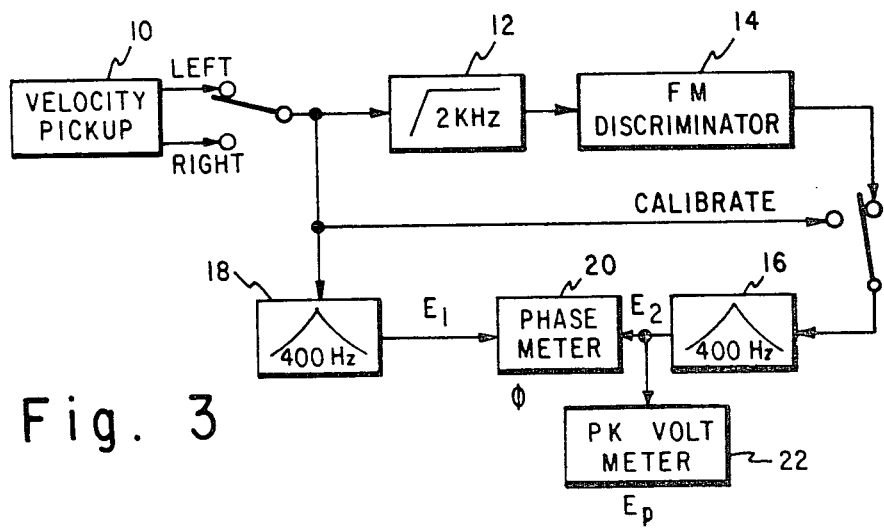
Fig. 3

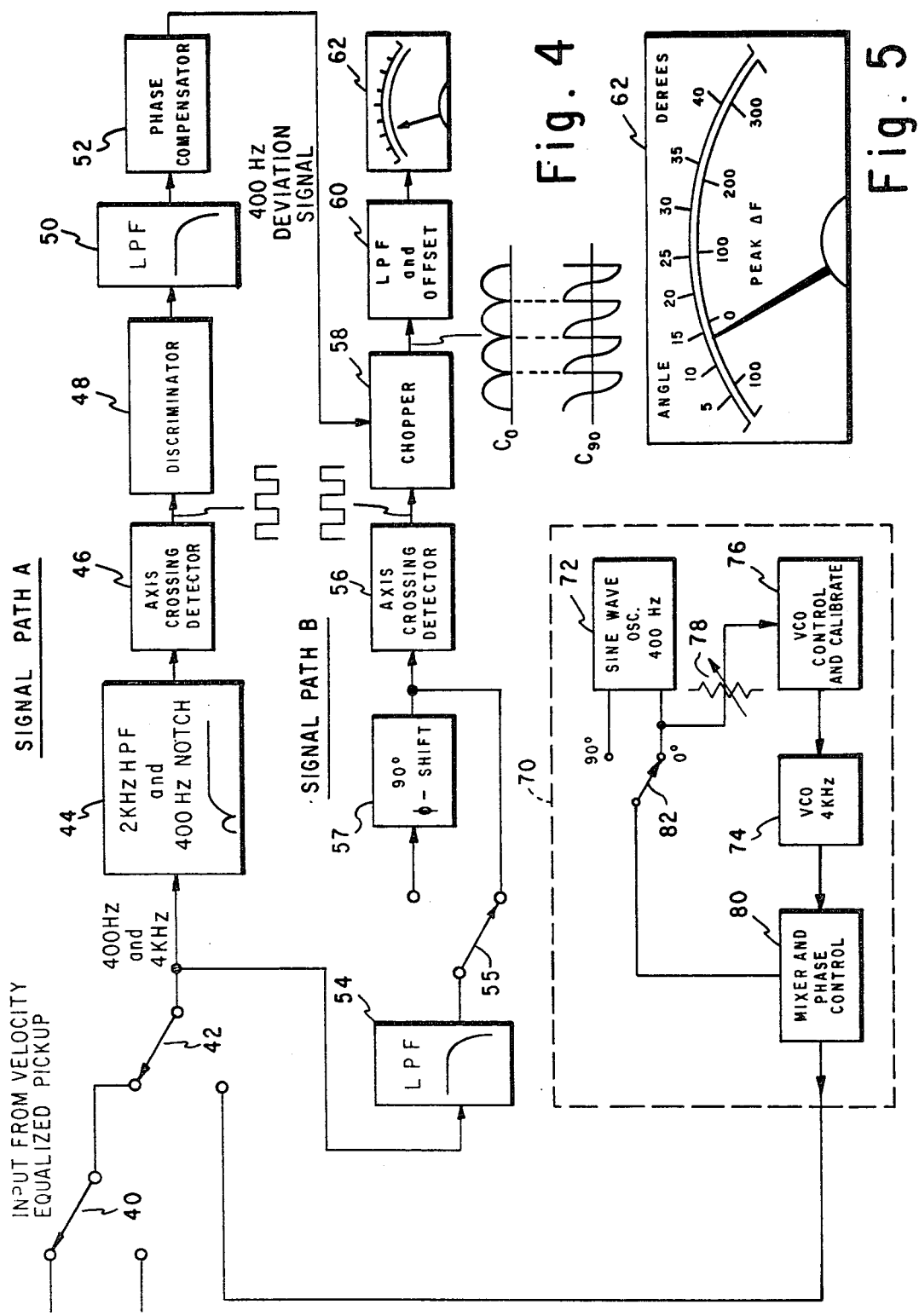

VERTICAL TRACKING ANGLE METER

BACKGROUND OF THE INVENTION

This invention relates generally to measurement instruments and, more particularly, to instruments for measuring the vertical tracking angle of phonograph pickups.

Shortly after the commercial introduction of the stereophonic audio disc record in 1957, record and pickup manufacturers became aware of the vertical tracking angle problem in record production. Among several papers describing the problem and techniques for measuring the vertical tracking angle are two by B. B. Bauer entitled "The Vertical Tracking Angle Problem In Stereophonic Record Production", *IEE Trans. Audio,* Volume AU-11, pp. 47–55 (1963 March–April) and "Vertical Tracking Improvement in Stereo Recording", *Audio,* pp 1–4 (February 1963). The vertical tracking angle is defined as the angle between two straight lines: one normal to the plane of the phonograph record and the other in the direction along which the stylus vibrates on the average while reproducing a purely vertical modulation on the record. To avoid vertical tracking distortion, this angle must equal the effective vertical angle with which the record grooves were recorded. As a result of the tests and conclusions presented in these and other papers the Recording Industry Association of America (RIAA) in 1961 recommended a vertical tracking angle of 15° for stereophonic cutters in order to provide a closer match to the vertical angle of pickups. This would presumably result in a vertical angle on records which would be easier to achieve in pickups, thereby reducing vertical tracking angle distortion.

In spite of the early effort toward standardization, recent studies by applicants and their colleagues have indicated that there still remains a large discrepancy between the vertical angles at which records are cut and the angles at which the information is played back. Part of the reason has been the lack of a precise and easy-to-use technique for measuring the vertical tracking angle in phonograph pickups. With a view toward satisfying the long-felt need for a suitable instrument for measuring vertical tracking angle, applicants and their colleagues have recently concluded a study to experimentally determine the accuracy and repeatability of various measurement techniques. Three test record-based approaches were examined and found to separately yield repeatable vertical angle measurements and to give results which were in close agreement with each other. A mechanical technique was also tried and found to be consistent with the test record-based measurements, albeit with somewhat poor repeatability. The details of these experiments and conclusions drawn therefrom are described in two papers authored by James V. White and Arthur J. Gust entitled "Measurement Of FM Distortion In Phonographs", *Journal of the Audio Engineering Society,* Vol. 27, No. 3, pp 121–133 (March 1979) and "Three FM Methods For Measuring Tracking Angles of Phono Pickups", *Journal Of The Audio Engineering Society,* Vol. 27, No. 4, pp 242–249 (April 1979), the content of both of which is hereby incorporated herein by reference. The second of these papers suggests that one of the measurement techniques evaluated, characterized as the "real-sine-wave" method could, in principle, be embodied in hardware that would permit the vertical angle of a pickup to be read from a meter while a single band on a CBS STR-112 test record and being played. The present invention is directed to the design and construction of an instrument which extracts and directly displays on a meter (without off-line computation) the vertical tracking angle of a pickup during playback of a known test record signal.

As background to a better understanding of the nature of the tracking angle problem and how it is addressed by the present invention, and to establish the coordinate system and applicable mathematical formulae, the disclosure of the aforementioned White and Gust papers will be briefly reviewed. Detailed derivations of the applicable mathematical formulae are contained in the aforementioned White and Gust papers and/or in the literature referenced therein and will not be repeated here. FIG. 1 schematically depicts a typical disc cutter, which is suspended and pivoted above the record surface such that the cutter tip motion is contained in a plane slanted away from the point of suspension. The angle $\theta_R$ between a line vertical to the record surface and a line perpendicular to an imaginary line drawn between the pivot point of the cutter assembly and the cutter tip, is defined as the vertical recording angle. If, for example, a sinusoidal vertical signal (A) is applied to the cutter, the modulation actually cut in the record is really contained in an inclined coordinate system as shown in waveform (B). As may be seen, what started as a simple sinusoidal signal is now a signal which is considerably altered in shape. Such a signal will produce distortion upon playback unless the transformation is accurately corrected.

The vertical tracking angle $\theta_P$ of a pickup cartridge is shown in FIG. 2 which depicts an ideal pickup with a rigid stylus shank, the figure suggesting (in exaggerated form) that the dynamic pivot point of the stylus shank may not be located along the longitudinal axis of the shank when an audio signal is reproduced. As indicated, the vertical tracking angle is measured from a line vertical to the record surface to an imaginary line perpendicular to an imaginary line drawn through the average position of the dynamic pivot point and the tip of the pickup stylus. It has been established that to avoid vertical tracking angle distortion, the pickup should apply the inverse of the transform that occurred during the cutting process. This is readily achieved if the pickup vertical angle $\theta_P$ equals the recorded vertical angle $\theta_R$.

In practice, in spite of the abovementioned RIAA standard, it has been found that the vertical angle of modern pickups does not match the vertical angle at which modern records have been cut. Vertical angles for three major disc cutters, used to produce most of the records made today, vary between 15° and 22°. The average vertical angle of ten high quality pickups that were measured in the course of the study was 29°, with angles of some as small as 22° and of others as large as 33°. Thus, a mismatch between the vertical angles $\theta_P$ and $\theta_R$ of as much as 18° can be expected with these combinations of record and pickup. The distortion due to vertical tracking angle mismatch is of greater concern today than heretofore for several reasons:

1. Present records often contain greater vertical signal content because of unique spatial effects or phase interactions which occur during a multitrack mixdown.

2. Present records are cut at levels which are several dB greater on the average, thereby directly increasing the percentage of vertical angle distortion.

3. Distortion in other components of audio recording and playback systems has been greatly reduced so that vertical tracking-produced distortion is likely to be the major cause of the total distortion in the reproduction chain.

While many techniques for the measurement of vertical tracking angle have been described in the literature, several suffer the disadvantage that they cannot be performed rapidly; others require the use of complex signals on test records which are difficult to produce accurately or require several bands of a test record to be played and calculations to be made to achieve an answer; and still others are readily contaminated by other forms of distortions, such as tracing.

Most investigators who have addressed the problem of measuring vertical tracking angle have concluded that the most reliable electrical technique is one in which a pair of test signals are recorded on the record in such a manner that distortion will produce an FM modulation during playback. Of the known FM techniques for the measurement of the vertical tracking angle, the "real-sine-wave" method described by White and Gust, which utilizes a readily available CBS STR-112 test record, has been emobodied in the measurement device of the present invention because it offers the best combination of speed and accuracy.

Briefly reviewing the "real sine wave" method described by White and Gust, the test setup shown in block diagram form in FIG. 3 is used together with a CBS STR-112 test record, using Group 2B of the bands on the record, which has 400 Hz and 4 KHz signals recorded together vertically with an effective vertical recording angle $\theta_R = 16.5° \pm 1°$. The appropriate channel signal (i.e., left or right) from a velocity-sensing pickup 10 is fed to a highpass filter 12 which passes frequencies above about 2 KHz to an FM discriminator 14. The output from discriminator 14 is a 400 Hz signal whose amplitude is proportional to the frequency deviation of the 4 KHz signal produced at the stylus tip. This signal is filtered by a bandpass filter 16, the output from which, designated $E_2$, is compared to the 400 Hz signal recorded directly on the record; this signal, designated $E_1$, is obtained by bandpass filtering, in filter 18, the signal generated by the velocity pickup 10. A phase meter 20 is provided to measure the phase lead of the 400 Hz frequency deviation of of the 4 KHz tone with respect to the recorded 400 Hz tone. It has been shown that tracking angle errors produce 400 Hz frequency deviations that are strictly either in phase or out-of-phase with the recorded 400 Hz in a velocity sensitive signal. In contrast, tracing errors produce frequency deviations that are strictly in quadrature. Thus, in the test setup of FIG. 3, if the 400 Hz voltage waveforms $E_1$ and $E_2$ are represented by phasors in the complex plane, and $E_1$ is defined to be real and positive, then only the real part of $E_2$ is influenced by the tracking angle error, in a properly calibrated experiment. Thus, the vertical tracking angle $\theta_P$ of the pickup at 400 Hz is given by the following formula when the real FM deviation is caused by tracking-angle errors:

$$\theta_P = \tan^{-1}[\tan\theta_R \pm 9.1 \times 10^{-4} RF \cos\phi / V_{400}]$$

where $\theta_P$ is the vertical playback angle in degrees; $\phi_R$ is the vertical recording angle; R is the groove radius in meters; $V_{400}$ is the peak velocity in meters per second of the recorded 400 Hz tone; F is the peak 400 Hz frequency deviation of the 4 KHz tone in Hz; and $\phi$ is the phase lead of $E_2$ with respect to $E_1$ in degrees. The peak value of $E_2$, read by voltmeter 22, is equal to kF, where k is the calibration constant of FM discriminator 14 in volts/Hz. The minus sign in the equation is used for data obtained from the left channel of the pickup output, and the plus sign for right-channel data. The correct polarity is usually obtained by making a known angular change (e.g., an increase) and determining whether the deviation follows suit (i.e., also increases).

The results published by White and Gust show that the test setup of FIG. 3 yields reliable measurements of the vertical tracking angle; however, the technique requires a considerable amount of expensive test equipment and has the significant disadvantage, from a user's standpoint, that it requires computation of the final results.

Accordingly, it is the object of the present invention to eliminate these restrictions and shortcomings by providing an electronic meter which allows direct reading of the vertical tracking angle.

SUMMARY OF THE INVENTION

Briefly, the measuring instrument according to the invention, which measures and displays the vertical tracking angle of a pickup playing a test record, having 400 Hz and 4 KHz recorded together with a known recording angle, directs the reproduced test signal to two paths, one of which includes a high-pass filter and an FM discriminator, the output of which is a 400 Hz signal whose amplitude is proportional to the frequency deviation of the 4 KHz signal, and the other of which includes a low-pass filter for removing the 4 KHz signal from the reproduced signal and leaving only the 400 Hz signal, and an axis crossing detector for converting the 400 Hz sine wave into a 400 Hz square wave. The 400 Hz deviation signal and the 400 Hz square wave signal are combined in a chopper circuit operable to produce an output signal waveform approximating a full wave rectified sine wave when the signals from the first and second paths are either in phase or 180° out-of-phase, and to produce an output signal that changes polarity at the peak of each cycle of the 400 Hz signal if the signals in the first and second paths are in quadrature. The output signal from the chopper is low-pass filtered to produce a resultant signal of finite value proportional to the frequency deviation caused by a vertical tracking angle mismatch between $\theta_R$ and $\theta_P$ when the signals in the two paths are either in phase or out-of-phase, or a signal of zero average value when the signals in the two paths are in quadrature. Thus, the circuit passes only the real component (due to tracking) and blocks the tracing-produced quadrature component. The output signal from the lowpass filter is applied to a meter designed to read directly the vertical tracking angle of the pickup under measurement.

BRIEF DESCRIPTION OF THE DRAWINGS

Other objects, features and advantages of the invention will become apparent, and its construction and operation better understood, from the following detailed description, taken in conjunction with the accompanying drawings, in which:

FIG. 1 is a schematic representation of vertical tracking angle $\theta_R$, to which reference has already been made;

FIG. 2 is a schematic representation of vertical tracking angle $\theta_P$, already referred to;

FIG. 3, previously referred to, is a block diagram of a test setup for the "real-sine-wave" method of measuring vertical tracking angle of a phonograph pickup;

FIG. 4 is a block diagram of a preferred form of measuring apparatus embodying the invention; and FIG. 5 is an illustration of the face of the meter of the apparatus of FIG. 4.

DESCRIPTION OF THE PREFERRED EMBODIMENT

Referring to FIG. 4, the input signal to the meter is obtained from a velocity sensing phonograph pickup, the vertical tracking angle of which it is desired to measure, playing the intermodulation bands on a CBS STR-112 or similar test record, consisting of two tones, a large displacement 400 Hz signal and a small displacement 4 KHz signal of known amplitude and recorded vertical angle, recorded together in the vertical modulation channel. The 4 KHz tone may be thought of as a carrier that is FM-modulated during playback by the 400 Hz tone, due, for instance, to tracing and tracking non-linearities. A switch 40 enables selection of either the left or right pickup channels, one of which has a 180° inverter (not shown) incorporated therein to ensure that the phase of the input signal is the same for both pickup channels. The output signal from the pickup is passed through a pre-amplifier with velocity equalization (flat for magnetic cartridge) (not shown) prior to application via a switch 42 to the meter. The input signal is applied to two signal paths, designated A and B, the signal path A containing a high-pass filter and a 400 Hz notch filter 44 designed to allow only the 4 KHz "carrier" and any sidebands about that signal to pass through. The signal passed by filter 44 is applied to an axis crossing detector 46 of conventional design for converting the 4 KHz sine wave into a 4 KHz square wave for application to a discriminator 48 of conventional design which demodulates the 4 KHz signal. The output from discriminator 48 is applied to a suitable lowpass filter 50 for isolating the 400 Hz component of the FM distortion resulting from any discrepancy between the vertical tracking angle of the pickup and the standardized vertical tracking angle of the test record. Thus, the output of filter 50 is a 400 Hz signal whose amplitude is proportional to the frequency deviation of the 4 KHz signal. Since operation of the meter is based on comparison of this deviation signal with the original 400 Hz reference on the test record, the deviation signal is applied to a phase compensator 52, which may be a phase-shift network of conventional design, for shifting the phase of the deviation signal by an amount such that it is precisely matched in phase with the 400 Hz reference signal transmitted by signal path B (to be described). More particularly, phase compensator 52 is designed to correct for any residual phase shift about 4 KHz introduced in the highpass section of filter 44.

Turning now to signal path B, the playback signal is applied to a low-pass filter 54 which removes the 4 KHz signal and passes only the 400 Hz signal. When a switch 55 is in the position shown, the output signal from filter 54 is applied to an axis crossing detector 56 which converts the 400 Hz sine wave into a 400 Hz square wave, which constitutes one input to a chopper circuit 58 to which the 400 Hz sinusoidal deviation signal from signal path A is also applied as a second input. The chopper 58 may be any of a number of multiplier circuits commercially available in integrated circuit form, such as the AD532 Multiplier available from Analog Devices or the MC1494 Multiplier available from Motorola Semiconductor, and functions to measure the magnitude of the 400 Hz deviation signal that is in phase with the 400 Hz reference sine wave recorded on the test record which, in turn, is proportional to the angular mismatch between $\theta_R$ and $\theta_P$. As employed in the present circuit, the multiplier consists essentially of a pair of signal paths, one of which includes an inverter and both of which include a switch. The deviation signal from phase compensator 52 is applied to both signal paths, and in the path containing the inverter is inverted before application to the switch. The switches are alternately opened and closed in synchronism responsively to the 400 Hz square wave signal from axis crossing detector 56. The square wave "chopping" signal having the same period as the sinsoidal deviation signal, the chopper provides the beneficial and unexpected result that if the signals in paths A and B are in phase with each other, or are 180° out of phase, the output of the chopper is as illustrated at $C_o$, namely, a signal corresponding to that which would result from full wave rectification of the 400 Hz deviation signal. When this signal is filtered by a low-pass filter 60, the resulting signal has an average finite value which is proportional to the frequency deviation caused by a vertical tracking angle mismatch between $\theta_R$ and $\theta_P$. This signal, together with an appropriate offset voltage (the need for which will be described presently) is applied to a meter 62 calibrated to directly read the vertical tracking angle of the pickup, namely, $\theta_P$.

If, however, the path A and path B signals applied to chopper 58 are in quadrature, then the resultant output of the chopper is as shown in the waveform designated $C_{90}$; it is seen that this signal has the form of a distorted sine wave which reverses polarity at the peak of each cycle. Accordingly, when this signal is passed through low-pass filter 60, the net output signal is zero; that is, there is no signal for application to meter 62. Thus, the meter responds only to the real component (due to tracking) and eliminates any contamination by tracing distortions that would otherwise affect the accuracy of measurement of the vertical tracking angle by blocking the quadrature component.

Reverting now to the meter 62, it will be recalled that the above-mentioned equation for calculating the vertical tracking angle contains a fixed term which is proportional to the tangent of the angle at which the record was cut. To account for the recording angle of the CBS STR-112 record, namely, 16.5°±1°, an appropriate offset voltage, generated in the circuit represented by block 60, is applied to meter 62, which may be a conventional voltmeter. This offset voltage causes the needle of meter 62 to read part way up the scale, as shown in FIG. 5, which is marked so that zero frequency deviation occurs at 16.5°. The meter scale, suitably calibrated on either side of the "zero frequency deviation" point, reads directly the vertical tracking angle of the pickup when playing Band B1 of Group 2B vertical intermodulation test, 400 Hz, +6 dB level, on the CBS STR-112 test record.

Although the described implementation of the invention contemplates using it in conjunction with the readily available CBS STR-112 test record, it will be appreciated that comparable results could be achieved with other test records having similar test signals recorded thereon, provided the vertical recording angle is precisely known. In the event the vertical recording angle of the alternately used test record differs from the 16.5° recording angle of the CBS test record, the offset voltage would be suitably adjusted to cause the meter to read zero frequency deviation at the vertical recording angle of the test record.

Because the phase of the 400 Hz signal reproduced from the test record is dependent upon the wiring of the pickup, whereas the FM deviation about the 4 KHz signal is independent of the pickup wiring, in practice the user of the instrument must select the correct connection between the inputs and the left and right pickup channels. To ascertain if the correct hookup has been made, the test record is played and one of the inputs selected by switch 40 which, in an operative embodiment, is in the form of a front panel switch, and an angular measurement taken. Next, the tracking force is increased, a light touch with the finger on the tone arm usually being sufficient, and if the angle displayed on meter 62 decreases, the connection is correct; otherwise, the two inputs to the meter should be interchanged.

The described instrument is adapted to read the vertical angle of each channel independently, as chosen by the input switch 40. Although both channels should exhibit identical readings, pickup alignment errors may modify the readings obtained on a left and right basis, in opposite directions. However, because the difference between the readings is always small, it is acceptable to average the vertical angle readings obtained on the left and right channels to obtain the final measurement of the vertical tracking angle of the pickup.

For calibration of the measuring instrument, a test signal generator 70 is built into the device and its output applied to the measuring circuit by actuation of switch 42 to the position opposite from that shown. Test signal generator 70 includes a sine wave oscillator 72 for generating a 400 Hz signal, provision being made for switching the phase of the 400 Hz signal from zero degrees to 90° to make sure that the system is isolating tracing and tracking components. A 4 KHz signal is produced by a voltage controlled oscillator 74, the control for which is provided by a control circuit 76 to which the 0° output of the 400 Hz oscillator 72 is applied via a suitable attenuator, schematically shown at 78, for establishing a preset amount of frequency deviation of the 4 KHz signal at a 400 Hz rate. A mixture of 400 Hz and 4 KHz (with a preset amount of frequency deviation) is provided by a mixer and phase control circuit 80, the output of which is applied to the measuring instrument. In an operative embodiment of the instrument, the test signal was calibrated to produce a deviation of ±100 Hz about the 4 KHz carrier signal. The 90° 400 Hz output of oscillator 72 (the only output from the test signal generator when switch 82 is in the "90°" position) simulates a pure tracing signal which should produce no vertical angle meter deflection, for the reasons discussed above in connection with the operation of chopper 58 and lowpass filter 60.

Careful measurement with the described vertical angle meter of the vertical tracking angle of eight high quality pickups, with each pickup measured a total of three times, the data averaged, and standard deviations computed, closely duplicated the test results reported by White and Gust obtained with the test setup illustrated in FIG. 3. The worst standard deviation was 0.48°, and the worst sfd error was 0.21°, from which it is concluded that, in practice, the meter accuracy will be about ±0.50°.

In addition to its described capability of measuring the vertical tracking angle of pickups, or, alternatively, the frequency deviation caused by vertical tracking angle mismatch, by inserting a 90° phase shift in the meter electronics, for example, by operating switch 55 to the opposite position from that shown so as to connect a 90° phase-shift device 57 between low-pass filter 54 and axis crossing detector 56, it is capable of measuring tracing-produced frequency deviation rather than that caused by vertical angle error. It is seen that the resulting 90° phase-shift of the signal in path B will put it in phase (or 180° out of phase) with any tracing-produced signal in path A and thus cause the output of chopper 58 to have the $C_o$ waveform and the filter 60 to produce a finite signal for application to meter 62, and in quadrature with any tracking angle-produced signal in path A so as to be blocked by filter 60 and not contaminate the meter reading of tracing distortion. This easy-to-use measurement of tracing distortion is useful for the evaluation of stylus wear.

The described instrument is also capable of measuring lateral tracking errors while playing a test record having intermixed 400 Hz and 4 KHz signals laterally recorded thereon with a known lateral recording angle, which in the usual case is 0°.

Although the described vertical tracking angle meter was designed to be used with a test record having 400 Hz and 4 KHz signals recorded together, the principles of operation of the meter are equally applicable to test signals consisting of other paired combinations of frequencies in the audio frequency range. That is the test signal, in the more general sense, should include a "low" frequency sinusoidal signal intermixed with a "high" frequency sinusoidal signal higher in frequency by a factor of approximately ten; for example, the intermixed signals may have frequencies of 500 Hz and 5 KHz, respectively. It will of course be understood that the filters in the measuring circuit would be suitably modified to accommodate to the frequencies used.

It will be evident from the foregoing that the described instrument, which can be manufactured at relatively low cost, allows rapid and precise electrical measurement of the vertical tracking angle of phonograph pickups and tracing distortion. A readily available CBS STR-112 (or similar) test record supplies the test signal. In short, the described vertical angle meter provides a low cost tool for manufacturers of phonograph pickups to use for measurement and monitoring of the vertical angles of their products.

We claim:

1. Apparatus for use with a test record having a test signal recorded thereon consisting of low and high audio frequency sinusoidal signals differing in frequency by a factor of about ten recorded together with a known recording angle, for measuring at least the tracking angle of a phonograph pickup during playback of said test signal, said apparatus comprising:

means for applying the test signal transduced from the test record by the pickup under measurement to first and second signal paths, said first signal path including discriminator means for producing a deviation signal at said low frequency of amplitude proportional to the frequency deviation produced at the stylus tip of said pickup due to mismatch between the tracking angle of said pickup and said known recording angle and to tracing distortion, and said second signal path including filter means for passing substantially only the low frequency signal transduced from said test record, and means for converting said low frequency signal to a square wave signal which is either in phase or 180° out of phase with respect to said deviation signal when said deviation is due to mismatch between said recording and tracking, angles and which is in quadrature phase relationship with respect to said deviation signal when said deviation is due to tracing distortion;

means for combining said deviation signal and said square wave signal and producing an output signal which has the characteristics of a full-wave rectified sine wave in response to components of said deviation signal that are either in phase or in phase opposition with respect to said square wave signal and amplitude proportional to the degree of mismatch between said recording and tracking angles, and which is symmetrical and changes polarity each cycle of said square wave signal in response to components of said deviation signal that are in quadrature phase relationship with said square wave signal;

a voltmeter calibrated to display at least the peak deviation of said deviation signal; and means connected between said signal combining means and said voltmeter for coupling to said voltmeter only a resultant signal of finite value proportional to the amplitude of an output signal having the characteristics of a full-wave rectified sine wave.

2. Apparatus according to claim 1, wherein the means connected between said combining means and said voltmeter includes circuit means for rejecting a symmetrical output signal while passing a signal of magnitude proportional to the average value of an output signal having the characteristics of a full-wave rectified sine wave and causing said voltmeter to indicate the tracking angle of the pickup under measurement.

3. Apparatus according to claim 1, wherein said second signal path includes selectable means for shifting the phase of the low frequency signal transmitted therethrough by 90° for causing said square wave signal to be in phase with a deviation signal due to tracing distortion and thereby cause said combining means to produce an output signal having the characteristics of a full-wave rectified sine wave and an amplitude proportional to the deviation caused by tracing distortion.

4. Apparatus according to claim 2 or 3, wherein the circuit means connected between said combining means and said voltmeter includes a low-pass filter.

5. Apparatus according to claim 1, wherein said combining means includes circuit means for chopping said deviation signal with said square wave signal.

6. Apparatus according to claim 1, wherein said voltmeter is calibrated to also display tracking angle, and wherein said means connected between said combining circuit and said voltmeter includes means for applying an offset voltage to said voltmeter for causing said voltmeter to indicate zero deviation for a tracking angle equal to said known recording angle.

7. Apparatus according to claim 1, wherein said low and high frequencies are respectively 400 Hz and 4 KHz.

8. Apparatus for use with a test record having a test signal recorded thereon consisting of 400 Hz and 4 KHz sinusoidal signals recorded together with known signal amplitude and vertical recording angle, for measuring the vertical tracking angle of a phonograph pickup during playback of said test signal, said apparatus comprising:

means for applying the test signal transduced from the test record by the pickup under measurement to first and second signal paths, said first signal path including discriminator means for producing a 400 Hz deviation signal of amplitude proportional to the frequency deviation produced at the stylus tip of said pickup due to mismatch between the vertical tracking angle of said pickup and said known vertical recording angle and also to tracing distortion, and said second signal path including filter means for passing substantially only the 400 Hz signal transduced from said record, and means for converting said 400 Hz signal to a square wave signal which is either in phase or 180° out of phase with respect to said deviation signal when said deviation is due to mismatch between said vertical recording and tracking angles and which is in quadrature with said deviation signal when said deviation is due to tracing distortion;

means for chopping said deviation signal with said square wave signal for producing an output signal having the characteristics of a full-wave rectified sine wave in response to components of said deviation signal that are either in phase or in phase opposition with respect to said square wave signal and having an amplitude proportional to the degree of mismatch between said known vertical recording angle and the vertical tracking angle of said pickup, and for producing an output signal which is symmetrical and changes polarity each cycle of said square wave signal in response to components of said deviation signal that are in quadrature phase relationship with said square wave signal;

a voltmeter calibrated to display at least the peak deviation of said deviation signal;

and means connected between said signal chopping means and said voltmeter for rejecting a symmetrical output signal while passing to said voltmeter only a signal having a magnitude proportional to the average value of an output signal having the characteristics of a full-wave rectified sine wave.

9. Apparatus according to claim 8, wherein said voltmeter is calibrated to display pickup tracking angle, and wherein said last-mentioned means includes means for applying an offset voltage to said voltmeter for causing the voltmeter to indicate zero deviation for a pickup tracking angle equal to said known recording angle.

10. Apparatus according to claim 8, wherein said apparatus further includes, in said second signal path, selectable means for shifting the phase of said 400 Hz signal by 90°, whereby to cause said voltmeter to indicate the degree of deviation due substantially only to tracing distortion.

* * * * *